United States Patent
Tseng et al.

(10) Patent No.: US 10,966,475 B2
(45) Date of Patent: Apr. 6, 2021

(54) FIXTURE, SYSTEM, AND METHOD FOR COATING PLASTIC GLOVE

(71) Applicant: Inteplast Group Corporation, Livingston, NJ (US)

(72) Inventors: Ben Tseng, Somerset, NJ (US); Chih Jen Hsu, Closter, NJ (US); Wenchao Hsieh, East Hanover, NJ (US); Jyh-Yao Raphael Li, Parsippany, NJ (US); Kelvin Yang, Madison, NJ (US)

(73) Assignee: Inteplast Group Corporation, Livingston, NJ (US)

( * ) Notice: Subject to any disclaimer, the term of this patent is extended or adjusted under 35 U.S.C. 154(b) by 22 days.

(21) Appl. No.: 15/965,400

(22) Filed: Apr. 27, 2018

(65) Prior Publication Data

US 2018/0310650 A1    Nov. 1, 2018

Related U.S. Application Data

(60) Provisional application No. 62/491,034, filed on Apr. 27, 2017.

(51) Int. Cl.
| | |
|---|---|
| *A41D 19/04* | (2006.01) |
| *A41D 19/02* | (2006.01) |
| *B29C 41/20* | (2006.01) |
| *B29C 41/08* | (2006.01) |
| *A41D 19/00* | (2006.01) |

(Continued)

(52) U.S. Cl.
CPC .......... *A41D 19/04* (2013.01); *A41D 19/0082* (2013.01); *A41D 19/02* (2013.01); *B05C 5/0208* (2013.01); *B05C 13/02* (2013.01); *B29C 41/08* (2013.01); *B29C 41/20* (2013.01);
(Continued)

(58) Field of Classification Search
CPC ........ G01M 3/027; B05C 13/00; B05C 13/02; B05C 5/0208; B05C 9/10; B05C 9/12; B05C 9/14; B29C 41/08; B29C 41/20; A41D 19/04; A41D 19/0082; A41D 19/02;
(Continued)

(56) References Cited

U.S. PATENT DOCUMENTS

| | | | |
|---|---|---|---|
| 2,120,406 A | 6/1938 | Hansen | |
| 2,440,398 A * | 4/1948 | Fenwicky | ............... F26B 9/003 34/105 |

(Continued)

FOREIGN PATENT DOCUMENTS

JP    57157715    *  9/1982

*Primary Examiner* — Laura Edwards
(74) *Attorney, Agent, or Firm* — Stinson LLP

(57) ABSTRACT

A fixture, system, and method for coating a glove with a coating material are described. A fixture includes a support member and a clamping member movable relative to the support member to a closed position. The clamping member is configured to be at least partially received in a cuff of the glove. In the closed position, the cuff is captured between the clamping member and the support member. In this configuration, a majority of an external surface of the glove is exposed for being coated. A glove-coating system can include one or more fixtures on a conveyor that move the fixture around various processing stages of the glove-coating system. In certain methods of coating a glove, coating material is applied to the glove while the glove is suspended from the fixture. The coated glove can be removed from the fixture without being everted.

19 Claims, 3 Drawing Sheets

(51) Int. Cl.
*B05C 13/02* (2006.01)
*B05C 5/02* (2006.01)
*B29K 105/00* (2006.01)
*B29L 31/48* (2006.01)

(52) U.S. Cl.
CPC .. *A41D 19/0058* (2013.01); *B29K 2105/0064* (2013.01); *B29L 2031/4864* (2013.01)

(58) Field of Classification Search
CPC ........ A41D 19/0058; B29L 2031/4864; B29K 2105/0064; B29D 99/0067
USPC .......................................................... 118/503
See application file for complete search history.

(56) References Cited

U.S. PATENT DOCUMENTS

| | | | |
|---|---|---|---|
| 3,637,411 A | 1/1972 | Agostinelli | |
| 3,687,702 A * | 8/1972 | May | B29C 37/0071 427/196 |
| 4,143,109 A | 3/1979 | Stockum | |
| 4,206,631 A * | 6/1980 | Nysse | G01M 3/3218 73/40 |
| 6,159,532 A | 12/2000 | Mallernee et al. | |
| 6,253,383 B1 | 7/2001 | Mallernee et al. | |
| 6,344,163 B1 * | 2/2002 | Ashley | B29C 33/046 264/310 |
| 6,412,436 B1 | 7/2002 | Mallernee et al. | |
| 6,630,152 B2 | 10/2003 | Chou | |
| 7,651,661 B2 | 1/2010 | Raad et al. | |
| 7,678,435 B2 | 3/2010 | Hassan et al. | |
| 7,713,472 B2 | 5/2010 | Raad et al. | |
| 7,718,240 B2 | 5/2010 | Neuser et al. | |
| 8,192,764 B2 | 6/2012 | Burton et al. | |
| 8,426,044 B2 | 4/2013 | Raad | |
| 8,992,959 B2 | 3/2015 | Amdur et al. | |
| 9,565,857 B2 | 2/2017 | Raad et al. | |
| 2004/0151919 A1 | 8/2004 | Bagwell et al. | |
| 2005/0147655 A1 | 7/2005 | Bagwell et al. | |
| 2007/0116747 A1 | 5/2007 | Yeap | |
| 2007/0154621 A1 | 7/2007 | Raad | |
| 2015/0000381 A1 * | 1/2015 | Marquez, Jr. | G01M 3/027 73/40.7 |
| 2015/0359945 A1 | 12/2015 | Rosenblatt et al. | |
| 2016/0058921 A1 | 3/2016 | Gros | |

* cited by examiner

FIXTURE, SYSTEM, AND METHOD FOR COATING PLASTIC GLOVE

CROSS-REFERENCE TO RELATED APPLICATIONS

This application claims priority to U.S. Provisional Patent Application Ser. No. 62/491,034, which was filed on Apr. 27, 2017, and which is incorporated by reference in its entirety.

FIELD

The present disclosure generally relates to a fixture, a system, and a method for forming a coated plastic glove.

BACKGROUND

In certain conventional processes for making plastic gloves, hand molds are dipped in a coagulant solution before being coated with a polymer for forming the glove (e.g., a latex, a vinyl, a nitrile, etc.). The liquid glove material is then cured in an oven, and the cured glove is everted to separate the glove from the mold. Because the glove is everted when removed from the mold, it is not possible to apply an exterior coating (e.g., an anti-microbial coating or the like) to an external surface until after the glove is removed from the mold. Thus, secondary processes are used to apply coating materials to the external surfaces of plastic gloves.

SUMMARY

In one aspect, a glove-coating fixture for mounting a glove in a glove-coating system comprises a support member having a proximal end portion and a distal end portion spaced apart along an axis. A clamping assembly includes a clamping member defining a proximally facing engagement surface shaped and arranged for being received in a cuff portion of the glove to suspend the glove from the clamping member. The clamping member is movable with respect to the support member between an open position in which the engagement surface is spaced apart distally from the distal end portion of the support member and a closed position in which the engagement surface opposingly engages the distal end portion of the support member whereby the cuff portion of the glove suspended from the clamping member is captured between the engagement surface of the support member and the clamping member to mount the glove on the fixture.

In another aspect, a method of coating a glove with a coating material comprises inserting an engagement surface of a clamping member of a fixture into a cuff portion of the glove to suspend the glove from the clamping member. The clamping member and suspended glove are moved to a closed position of the fixture in which the clamping member captures the cuff portion of the glove between the engagement surface and a distal end portion of a support member of the fixture to mount the glove on the fixture. The glove is coated with the coating material while the glove is mounted on the fixture.

In still another aspect, a method of coating a glove with a coating material comprises suspending the glove from a fixture. The glove is coated with the coating material while the glove is suspended from the fixture. The coated glove is removed from the fixture without everting the glove.

Other aspects and features will be apparent and/or pointed out hereinafter.

BRIEF DESCRIPTION OF THE DRAWINGS

Corresponding reference characters indicate corresponding parts throughout the drawings.

DETAILED DESCRIPTION

Figure 1:
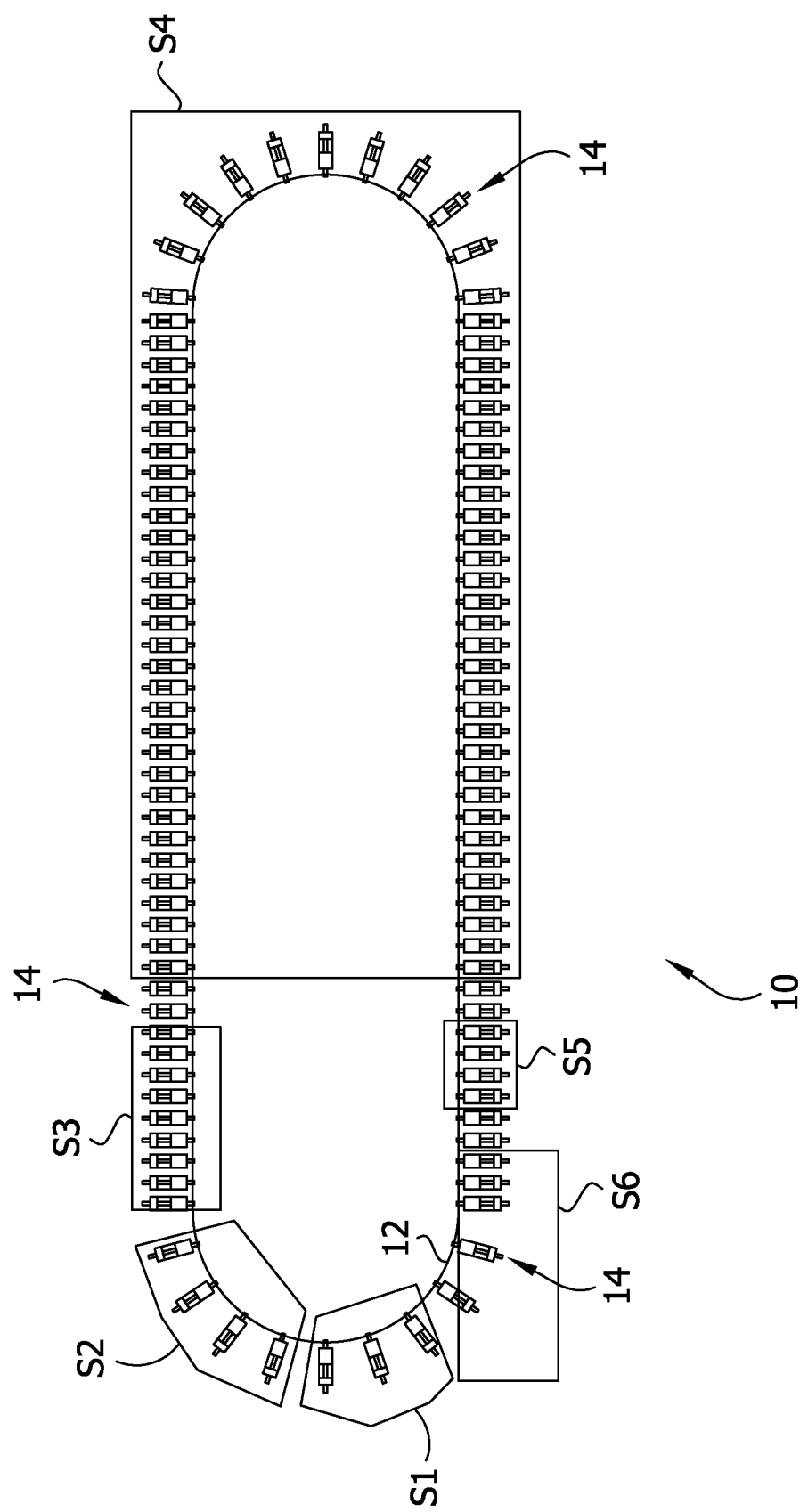
FIG. 1 is a schematic illustration of a system for coating gloves.

Referring to FIG. 1, a system for performing a secondary coating process to apply a coating to plastic gloves G (FIG. 4) is generally indicated at reference number 10. The system 10 includes a conveyor 12 configured to move a train of glove holding fixtures, generally indicated at reference number 14, around a coating process loop comprising a plurality of stages S1-S6. In an initial donning stage S1, gloves G are individually mounted on the fixtures 14 so that a majority of the external surface of each glove is exposed as described in further detail below. At a second inflation stage S2, pressurized air is delivered through the fixtures 14 into the interiors of the gloves G to inflate the gloves as will be further described.

Subsequently, at a spraying stage S3, a liquid coating material is sprayed along the exposed external surfaces of the gloves. Any desired liquid coating material can be used without departing from the scope of the invention. But in certain embodiments, the liquid coating material is configured to form an antimicrobial coating on the glove. Exemplary antimicrobial coatings are described, for example, in U.S. Pat. Nos. 7,651,661, 7,713,472, 8,426,044, U.S. Patent Application Publication No. 2007/0154621, U.S. Pat. No. 9,565,857, and U.S. Patent application Publication No. 2015/0359945, each of which is expressly incorporated by reference in its entirety. Suitably, the spraying stage S3 is configured to spray the coating material around the full circumference of the gloves G to provide a substantially continuous coating over the gloves.

After the gloves G are sprayed, the conveyor 12 moves the gloves to a curing stage S4 in which the liquid coating material is cured. In one embodiment, the glove-coating system 10 includes an oven (not shown) arranged to receive and heat the gloves G as the conveyor 12 moves the gloves through the curing stage. For example, in one or more embodiments the oven can be set to a temperature in an inclusive range of from about 0° C. to about 300° C. Thus, in one or more embodiments, the coating material is a heat-curable material. In other embodiments, the coating material can be cured in other ways. After exiting the curing stage S4, the conveyor 12 moves the gloves G through a cooling stage S5 and then a removal stage S6. In the cooling stage S5 the gloves G are cooled, for example by convection, to cause the coated gloves to set to prevent them from adhering to one another on contact. At the removal stage S6, the gloves G are deflated and separated from the fixtures 14 without everting the gloves as described below. Thus, after the gloves G removed from the fixture, the coating material is cured upon the external surface of the gloves.

Figure 2:
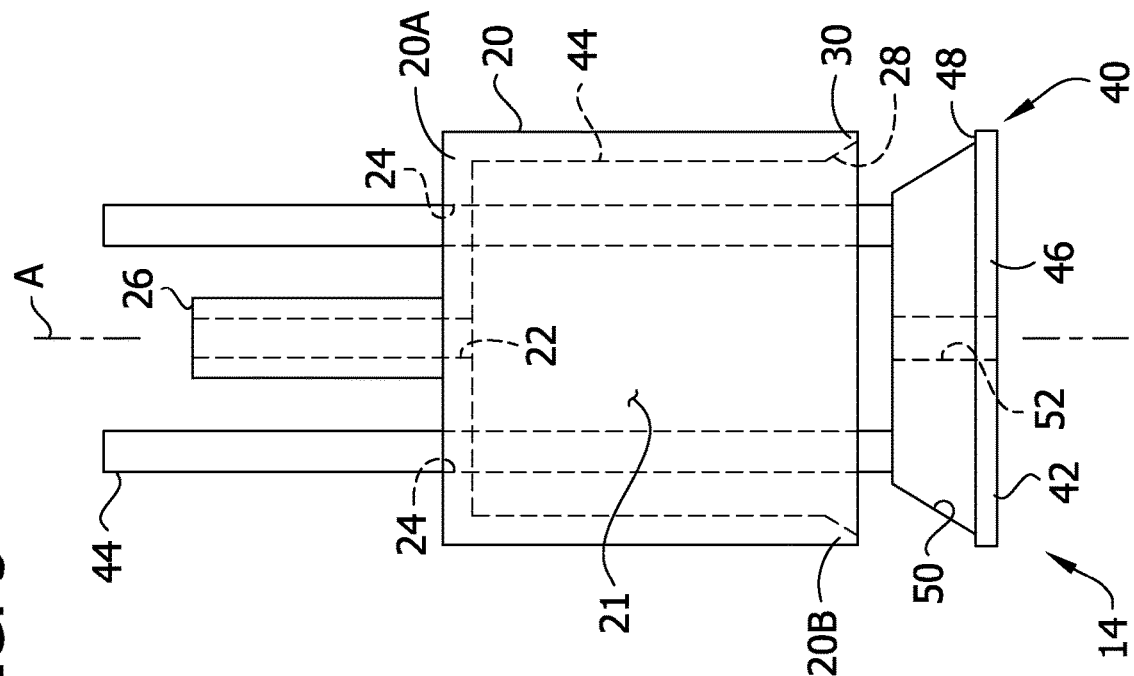
FIG. 2 is an elevation of a glove-coating fixture of the system of FIG. 1 in a closed position, with internal parts shown in hidden lines.
Figure 3:
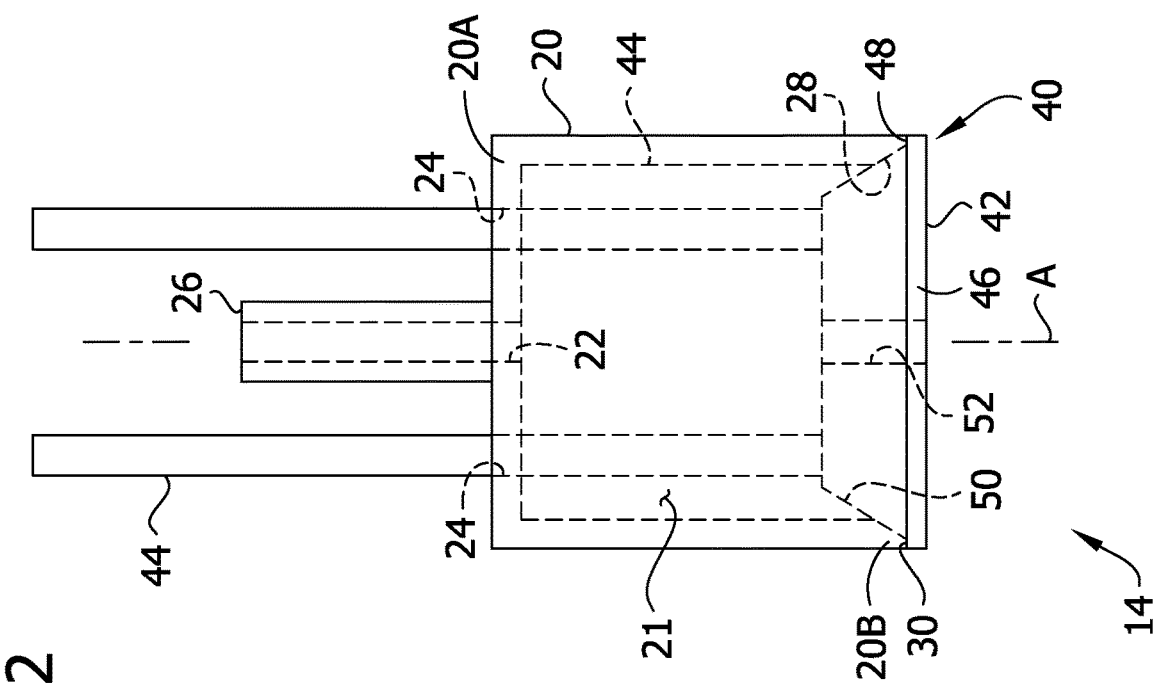
FIG. 3 is an elevation of the glove-coating fixture in an open position, with internal parts shown in phantom.
Figure 4:
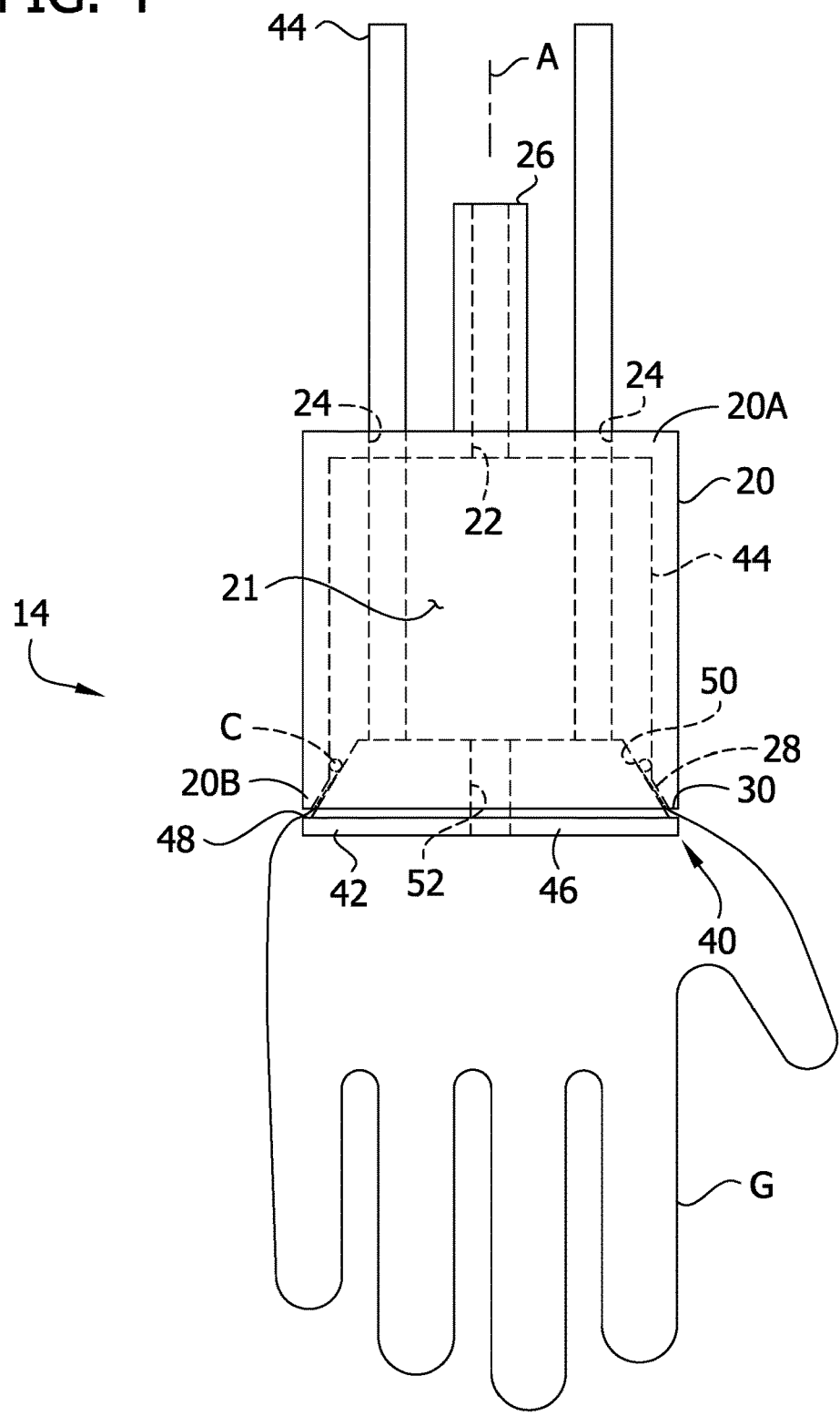
FIG. 4 is an elevation of the glove-coating fixture and a glove installed in the fixture, with internal parts shown in hidden lines.

Referring to FIGS. 2-4, an exemplary embodiment of a glove-coating fixture 14 will now be described. The fixture 14 includes a support member 20 configured to be fastened to the conveyor 12 for movement around the glove-coating process loop. The support member 20 has a proximal end portion that defines a proximal end wall 20A and an open distal end portion that defines a clamping rim 20B spaced apart from the proximal end portion along an axis A. A generally cylindrical side wall extends between the proximal end wall 20A and the distal rim 20B and defines an interior chamber 21. Although the illustrated support member 20 is generally cylindrical in shape, it will be understood that other support members can have other shapes in other embodiments.

The proximal end wall 20A defines an inflation port 22 and first and second bearing holes 24 that extend through the thickness of the proximal end wall. In certain embodiments, the bearing holes 24 are defined by bearing surfaces integrally formed with the rest of the distal end wall 20A, but separate bearing inserts can also define the bearing holes in other embodiments. An inflation fitting 26 is mounted on the proximal end wall 20A in fluid communication with the inflation port 22. Suitably, the inflation fitting 26 is configured to be fluidly connected to a source of inflation fluid (not shown) of the glove-coating system 10. For example, in one or more embodiments, an air compressor is configured to direct air through the inflation fitting 26 and inflation port 22 and into the interior chamber 21 of each fixture 14 when the fixture is moved through the inflation stage S2 of the glove-coating system 10.

As explained below, the distal rim 20B of the support member 20 is shaped and arranged for capturing a cuff portion C (FIG. 4) of the glove G to mount the glove on the fixture 14. The distal rim 20B of defines an inner chamfer 28 sloping outward at an angle with respect to the axis A. In addition, the rim 20B defines an outer end surface 30 oriented generally perpendicular to the axis A. It is understood that the rim could have other shapes in other embodiments.

A glove clamping assembly, generally indicated at 40, is slidably mounted on the support member 20 for movement along the axis A between a closed position (FIGS. 2 and 4) and an open position (FIG. 3). The glove clamping assembly 40 includes a clamping member 42 and first and second guide shafts 44 that are slidably received in the bearing holes 24. The guide shafts 44 are configured to slide through the holes 24 along the axis A to move the glove clamping assembly 40 along the axis with respect to the support member 20. In one or more embodiments, the shafts 44 sealingly engage the bearing surfaces defining the holes 24 such that the fixture 14 is configured to hold pressure in the interior chamber 21 of the support member 20 in the closed position. In one embodiment, a user manually moves the clamping assembly 40 with respect to the support member 20 to open and close the fixture 14 in accordance with the method of coating a glove set forth below. In other embodiments, the glove-coating system 10 is configured to automatically open and close the fixture 14, for example, using a camming mechanism (not shown) of the glove-coating system that is operatively connected to the shafts 44.

In certain embodiments, the clamping assembly 40 is resiliently biased toward the closed position. For example, a spring mechanism (not shown) can be connected between the clamping assembly 40 and the support member 20 to impart a yieldable biasing force upon the clamping assembly in the proximal direction. When a distal force is imparted on the clamping assembly 40 to open the fixture 14, the spring mechanism yields to permit opening of the fixture. And when the distal force is released, the spring mechanism draws the clamping assembly 40 proximally to the closed position. In other embodiments other mechanisms (e.g., latches, locking mechanisms, etc.) for holding the clamping assembly in the closed position can be used without departing from the scope of the invention.

Referring to FIG. 4, the clamping assembly 40 is configured to capture a cuff portion C of the glove G between the rim 20B of the support member 20 and the clamping member 42 when the fixture 14 is in the closed position. The clamping member 42 has a proximal end portion that is attached to the distal ends of the shafts 44 and a distal end portion that includes a lip 46 having a proximally facing shoulder 48. In the illustrated embodiment, the shoulder 48 defines a proximally facing engagement surface oriented substantially perpendicular to the axis A. The engagement surface of the shoulder 48 is sized and arranged for abutting engagement with the outer end surface 30 of the rim 20B. The proximal end portion of the clamping member 42 defines a generally conical (e.g., frusto-conical) side surface 50. The side surface 50 extends from the proximal end of the clamping member 42 to the shoulder 48. The conical side wall 50 is sloped with respect to the axis A at about the same angle as the chamfer 28 of the support member rim 20B. As shown in FIG. 2, the conical side wall 50 is sized and arranged to extend into the interior chamber 21 of the support member in the closed position. Moreover, when the fixture 14 is closed, the side wall 50 opposingly engages the chamfer 28 of the rim 20B in a closely conforming fit. In contrast, the side wall 50 is spaced apart distally from the rim 20B in the open position. The lip 46 is sized and arranged to be received in the cuff portion C of the glove G. For example, in one embodiment, the lip 46 is sized so that the cuff portion C must be stretched to expand circumferentially to fit over the lip. When the cuff portion C is installed over the lip 46 and the fixture 14 is subsequently closed, the cuff portion is captured between the clamping member 42 and the rim 20B of the support member 20. More specifically, the cuff portion C is compressed between the chamfer 28 and the side surface 50 as well as the engagement surface of the shoulder 48 and the end surface 30 to mount the glove G on the fixture 14.

Suitably, when the glove G is mounted on the fixture 14, the clamping member 42 and the rim 20B sealingly engage the cuff portion C to form an inflation seal between the fixture 14 and the glove G. In the illustrated embodiment, the clamping member 42 defines an inflation passage 52 extending from the proximal end through the distal end. When the glove G is mounted on the closed fixture 14, the clamping member 42 and the rim 20B compress the cuff portion C of the glove G to form the inflation seal. Inflation fluid directed through the inflation fitting 26 and the inflation port 22 fills the interior chamber 21. The inflation seal prevents at least some of the inflation fluid from escaping the chamber 21 through the interfaces between the support member 20, the clamping member 40, and the glove G. Thus, the inflation fluid flows through the inflation passage 52 into the glove G and expands the glove by inflation.

An exemplary method of using each of the glove-coating fixtures 14 in the glove-coating system 10 will now be briefly described. Initially, each fixture 14 is in the open position (FIG. 3) as the conveyor 12 moves the fixture into the donning stage S1. That is, the engagement surface of the shoulder 48 is spaced apart from the distal end surface 30 and the conical side surface 50 is spaced apart from the chamfer 28. While the conveyor 12 moves the fixture 14 through the donning stage S1, a line worker positions the cuff portion C of the glove G over the lip 46 of the clamping member 42 and then moves the clamping assembly 40 relative to the support member 20 to the closed position. In the closed position the cuff portion C is captured between the conical side surface 50 of the clamping member 42 and the chamfer 28 of the support member 20, as well as the shoulder 48 of the clamping member and the end surface 30 of the support member. The clamping member 42 and the support member 20 form an inflation seal with the cuff portion C of the glove G so that the inflation passage 52 fluidly couples the interior of the glove to the interior chamber 21 of the support member.

With the glove G installed in the fixture 14, the conveyor 12 moves the fixture to the inflation stage S2. At the inflation stage S2, the coating system 10 directs inflation fluid through the inflation fitting 26 and the inflation port 22 into the interior chamber 21. The inflation seal between the clamping member 42, the cuff portion C of the glove G, and the support member 20 inhibits at least some of the pressurized inflation fluid from escaping the interior chamber 21 through the interface between the support member and the clamping member. Thus the fluid flows through the inflation passage 52 into the interior of the glove G and inflates the glove.

The conveyor 12 moves the fixture 14 and the inflated glove G to the spraying stage S3, where the glove-coating system 10 sprays a liquid coating agent over the exposed external surface of the glove. As illustrated in FIG. 4, only a small margin of the cuff portion C is masked by the clamping engagement of the fixture 14, and thus the substantial majority of the external surface of the glove G is exposed for receiving the liquid coating material in the spraying stage S3. The glove-coating system 10 sprays the coating material onto the full perimeter of the glove G by revolving at least one spray head 360° around each glove or rotating each glove 360° about the axis A with respect to the spray head as the glove is moved through the spraying stage. The expanded condition of the gloves G under pressurized inflation maximizes the exposed surface area of the gloves by eliminating wrinkles, creases, or other overlap that would inhibit full coating coverage.

The conveyor 12 moves each liquid-coated glove G through the curing stage S4. In the illustrated embodiment, the conveyor 12 moves the inflated and liquid-coated glove through a curing oven while it is installed in the fixture 14 of the coating system 10. Heat from the curing oven cures the coating liquid to form a permanent coating on the glove G. Then the conveyor 12 moves the fixture 14 and the coated glove G through the cooling stage S5, where the glove is cooled by cool air convection to cause the coated gloves to set to prevent them from adhering to one another on contact. The conveyor 12 finally moves the fixture 14 and the cooled glove G to a removal stage S6, where the fixture 14 is opened and the glove is removed from of the clamping member 42 without everting the glove. In one embodiment, compressed air is blown through the fixture 14 after the fixture is opened to remove the glove G. Suitably, a glove holding bin (not shown) is positioned to receive the coated glove G when it is blown off of or otherwise removed from the fixture 14. Each fixture 14 remains open as the conveyor 12 moves the fixture to the donning stage S1 to repeat the glove-coating process loop.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatuses, systems, and methods without departing from the scope of the invention, it is intended that all matter contained in the above description and shown in the accompanying drawings shall be interpreted as illustrative and not in a limiting sense.

What is claimed is:

1. A glove-coating fixture for mounting a glove in a glove-coating system, the glove-coating fixture comprising:
a support member having a proximal end portion and a distal end portion spaced apart along an axis, the distal end portion defining a distal end of the support member, the distal end portion includes a distally facing end surface at the distal end of the support member; and
a clamping assembly including a clamping member defining a proximally facing engagement surface shaped and arranged for being received in a cuff portion of the glove to suspend the glove from the clamping member, the clamping member including a radially extending lip located at the distal end portion of the clamping member, the lip defining the engagement surface, the clamping member being movable with respect to the support member between an open position and a closed position, wherein in the open position the engagement surface is spaced apart distally from the end surface of the support member and the engagement surface is in an opposed facing relation with the end surface, and wherein in the closed position the engagement surface is closer to the end surface of the support member whereby the cuff portion of the glove suspended from the clamping member is captured between the engagement surface and the end surface to mount the glove on the fixture.

2. The glove-coating fixture as set forth in claim 1 wherein the clamping member has a proximal end portion defining a side surface extending proximally from the lip.

3. The glove-coating fixture as set forth in claim 2 wherein the side surface has a conical shape and is disposed radially inward of the engagement surface.

4. The glove-coating fixture as set forth in claim 3 wherein the support member has a side wall extending proximally from the end surface and defining an interior chamber configured to receive the proximal end portion of the clamping member therein when the fixture is closed.

5. The glove-coating fixture as set forth in claim 4 wherein the distal end portion of the support member defines an internal chamfer sloped at an angle corresponding to the side surface of the proximal end portion of the clamping member.

6. The glove-coating fixture as set forth in claim 2 wherein the support member has a side wall extending proximally from the rim end surface and defining an interior chamber configured to receive the proximal end portion of the clamping member therein when the fixture is closed.

7. The glove-coating fixture as set forth in claim 2 wherein the side surface extends from the engagement surface.

8. The glove-coating fixture as set forth in claim 1 wherein the engagement surface is oriented substantially perpendicular to the axis and the end surface is oriented substantially perpendicular to the axis.

9. The glove-coating fixture as set forth in claim 1 wherein the support member and the clamping member are configured to sealingly engage the cuff portion of the glove in the closed position.

10. The glove-coating fixture as set forth in claim 1 wherein the clamping member defines an inflation passage in fluid communication with an interior of the glove when the cuff portion of the glove receives the clamping member and the fixture is in the closed position.

11. The glove-coating fixture as set forth in claim 10 wherein the support member has an interior and the inflation passage is configured to provide fluid communication between the interior of the support member and the interior of the glove.

12. The glove-coating fixture as set forth in claim 11 further comprising an inflation fitting configured to be fluidly coupled to a source of inflation fluid whereby the inflation fitting provides fluid communication between the source of inflation fluid and the interior of the support member.

13. The glove coating fixture as set forth in claim 1 wherein the clamping member is movable with respect to the support member along the axis and the lip projects from a remainder of the clamping member in a direction perpendicular to the motion axis.

14. The glove-coating fixture as set forth in claim 1 wherein in the closed position the engagement surface is in an opposed facing relation with the end surface.

15. A glove-coating system comprising a sprayer and the glove-coating fixture as set forth in claim 1.

16. The glove-coating system as set forth in claim 15 further comprising a plurality of additional glove-coating fixtures as set forth in claim 1.

17. The glove-coating system as set forth in claim 16 wherein the support member of each of said glove-coating fixture and said plurality of additional glove coating fixtures is connected to a conveyor for moving the glove-coating fixture through a glove-coating process loop.

18. A glove-coating fixture for mounting a glove in a glove-coating system, the glove-coating fixture comprising:
a support member having a proximal end portion and a distal end portion spaced apart along a central axis; and
a clamping assembly including a clamping member defining a proximally facing engagement surface shaped and arranged for being received in a cuff portion of the glove to suspend the glove from the clamping member, the clamping member being movable with respect to the support member between an open position in which the engagement surface is spaced apart distally from the distal end portion of the support member and a closed position in which the engagement surface is closer to the distal end portion of the support member whereby the cuff portion of the glove suspended from the clamping member is captured between the engagement surface of the support member and the clamping member to mount the glove on the fixture, the clamping assembly including first and second guide shafts disposed about the central axis, the first and second guide shafts slidably received in and in sealing engagement with bearing holes in the support member.

19. The glove-coating fixture as set forth in claim 18 wherein the support member includes an inflation fitting disposed co-axially with the central axis.

* * * * *